United States Patent
Bullmer et al.

[11] Patent Number: 5,407,401
[45] Date of Patent: Apr. 18, 1995

[54] ARRANGEMENT OF CONTROLLING THE OUTPUT TORQUE OF AN AUTOMATIC TRANSMISSION

[75] Inventors: Wolfgang Bullmer, Bietigheim-Bissingen; Martin Streib, Vaihingen/Enz; Richard Schöttle, Mühlacker; Hong Zhang, Schieberdingen, all of Germany

[73] Assignee: Robert Bosch GmbH, Stuttgart, Germany

[21] Appl. No.: 137,006

[22] PCT Filed: Jan. 15, 1993

[86] PCT No.: PCT/DE93/00027
§ 371 Date: Oct. 14, 1993
§ 102(e) Date: Oct. 14, 1993

[87] PCT Pub. No.: WO93/16303
PCT Pub. Date: Aug. 19, 1993

[30] Foreign Application Priority Data
Feb. 14, 1992 [DE] Germany ............ 42 04 401.4

[51] Int. Cl.⁶ ............................................. F16H 61/08
[52] U.S. Cl. ...................................... 477/110; 477/109
[58] Field of Search .............................. 477/110, 109

[56] References Cited

U.S. PATENT DOCUMENTS

| | | | |
|---|---|---|---|
| 4,724,723 | 2/1988 | Lockhart et al. | 475/107 |
| 4,815,340 | 3/1989 | Iwatsuki et al. | 477/109 |
| 4,819,163 | 4/1989 | Shimizu et al. | 364/424.1 |
| 4,889,014 | 12/1989 | Iwata | 477/109 |
| 5,046,176 | 9/1991 | Lin | 364/424.1 |
| 5,079,970 | 1/1992 | Butts et al. | 477/109 |
| 5,086,666 | 2/1992 | Moriki | 477/109 |
| 5,091,854 | 2/1992 | Yoshimura et al. | 364/424.1 |
| 5,101,687 | 4/1992 | Iwatsuki et al. | 477/109 |
| 5,129,286 | 7/1992 | Nitz et al. | 477/109 |
| 5,133,227 | 7/1992 | Iwatsuki | 477/110 |

FOREIGN PATENT DOCUMENTS

| | | |
|---|---|---|
| 0411558 | 2/1991 | European Pat. Off. |
| 2938268 | 4/1981 | Germany |
| 3140259 | 4/1983 | Germany |

*Primary Examiner*—Dirk Wright
*Attorney, Agent, or Firm*—Walter Ottesen

[57] ABSTRACT

An arrangement for controlling the output torque ($M_{ab}$) of an automatic transmission (10) during the sequence of a shift operation in a motor-driven vehicle to a value pregiven by the driver is suggested with the transmission (10) having at least two transmission stages (11, 12) which can be alternately shifted into via clutches (16, 17). During upshifting, the clutch (17) assigned to the higher transmission stage is continuously closed in a time-controlled manner with the motor torque being increased correspondingly for holding the output torque ($M_{ab}$) constant. The first clutch (16) is assigned to the lower transmission stage and is opened when this first clutch (16) no longer transmits torque. Thereafter, the second clutch (17) is brought to its synchronous rpm by reducing the motor torque ($M_m$) and then driven further without slippage. The downshifting operation takes place in a changed sequence in a like manner. A great shift comfort while avoiding any jolts is obtained when shifting with the shift operations being configured as above.

19 Claims, 5 Drawing Sheets

ARRANGEMENT OF CONTROLLING THE OUTPUT TORQUE OF AN AUTOMATIC TRANSMISSION

FIELD OF THE INVENTION

The invention relates to an arrangement for controlling the output torque of an automatic transmission in a motor-driven vehicle to a value pregiven by the driver. The transmission has at least two transmission stages which are alternately engageable via clutches.

BACKGROUND OF THE INVENTION

In conventional automatic transmissions, usually a drop of the output torque takes place, for example, when upshifting and this leads to a jolt which affects comfort. The engine torque can be influenced in an appropriate manner during the shifting operation in order to mitigate this jolt. This can be done, for example, by changing the ignition angle or the like in order to smooth the curve of the output torque to improve comfort and reduce the load on the transmission. A different output torque is nonetheless present before and after the shifting operation. The terms used "output moment" and "output torque" include the transmission output torque.

U.S. patent applications Ser. No. 07/923,582 and 08/050,085, filed Aug. 3, 1992 and Apr. 28, 1993, respectively, already suggest that the output torque can be held at the same level before and after the shifting operation when the driver command does not change during shifting. The output torque (torque of the transmission output) and therefore the traction force at the drive wheels is so controlled that this torque is independent within wide limits of the gear stage which has just been engaged or the state of the converter lockup clutch. This method is known to experts in the field under the name "mastershift". With the aid of this known control function, the shift points of the transmission can be placed in areas of optimal use without it being necessary to assume losses with respect to sportiness and the metering of traction force. The known control function however relates only to the control of the output torque outside of the shifting operations. A conventional engine torque curve during the shifting operation leads to an abrupt drop in the output torque during this shifting operation. It is intended to avoid this drop as possible with respect to the shifting comfort.

SUMMARY OF THE INVENTION

The arrangement according to the invention for the upshifting and downshifting affords the advantage with respect to the foregoing that the output torque remains constant even during the shifting operation so that shifting operations are achieved with optimal comfort without any jolt. Realization is possible without mechanical changes in conventional automatic transmissions when the pressure in the engaging and disengaging clutches is electronically controllable with only electronic control functions being added which lead to only a slight increase in cost.

The means of reducing the clutch-closing pressure during downshifting advantageously include a control means which affects the transition into the sliding friction of the second clutch by means of a short-term additional reduction of the engaging pressure. The transition from static friction to sliding friction is customarily associated with a hysteresis. For this reason, this transition is achieved advantageously by superposing a negative value on this engaging pressure.

In an advantageous manner, first computation means are provided in order to compute the desired value for the transmission torque in dependence upon the particular transmission stage and the clutch-engaging pressure of the corresponding clutch from the pregiven desired value for the output torque. The means for continuously time-controlling the disengagement and engagement of the clutch advantageously includes for this purpose a ramp control for the desired value of the transmission torque. A desired value for the clutch pressure required for this purpose is computed from this desired value for the transmission torque of the clutch. By means of the ramp control, the continuous disengagement and engagement of the clutch is simultaneously controlled and the desired value for the transmitting torque is computed. The desired value can serve for appropriately synchronizing the ramp control of the engine torque.

Furthermore, a computation stage in the first computation means has been shown to be advantageous in order to take into account the unavoidable dead times and reaction times in the transmission. The first computation means is for determining a theoretical actual value for the transmission torque of the corresponding clutch from the desired value while considering a pressure controller model for the corresponding pressure controller. In this way, the corresponding engine torque can be regulated with still greater precision.

Comparison means compare a computed end value for the transmission torque of the particular slipping clutch to the instantaneous value of this transmission torque. During the upshifting operation when reaching equality, this comparison means serves to disengage the other participating clutch and initiates influencing the engine in order to bring the slipping clutch to its synchronous rpm.

When reaching the particular synchronous rpm of the slipping clutch, means for increasing pressure of the clutch pressure are advantageously provided which increase this clutch pressure to a value preventing the slippage.

An electronic control unit for adjusting the actual engine torque is suitably connected to the engine in order to convert the computed desired values to actual values in the engine and in the transmission. The desired value for the motor torque can be applied to the electronic control unit. Furthermore, the clutches for the individual transmission stages are connected to pressure controllers or to suitably controlled valves to which is applied the particular desired value for the clutch-engaging pressure.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
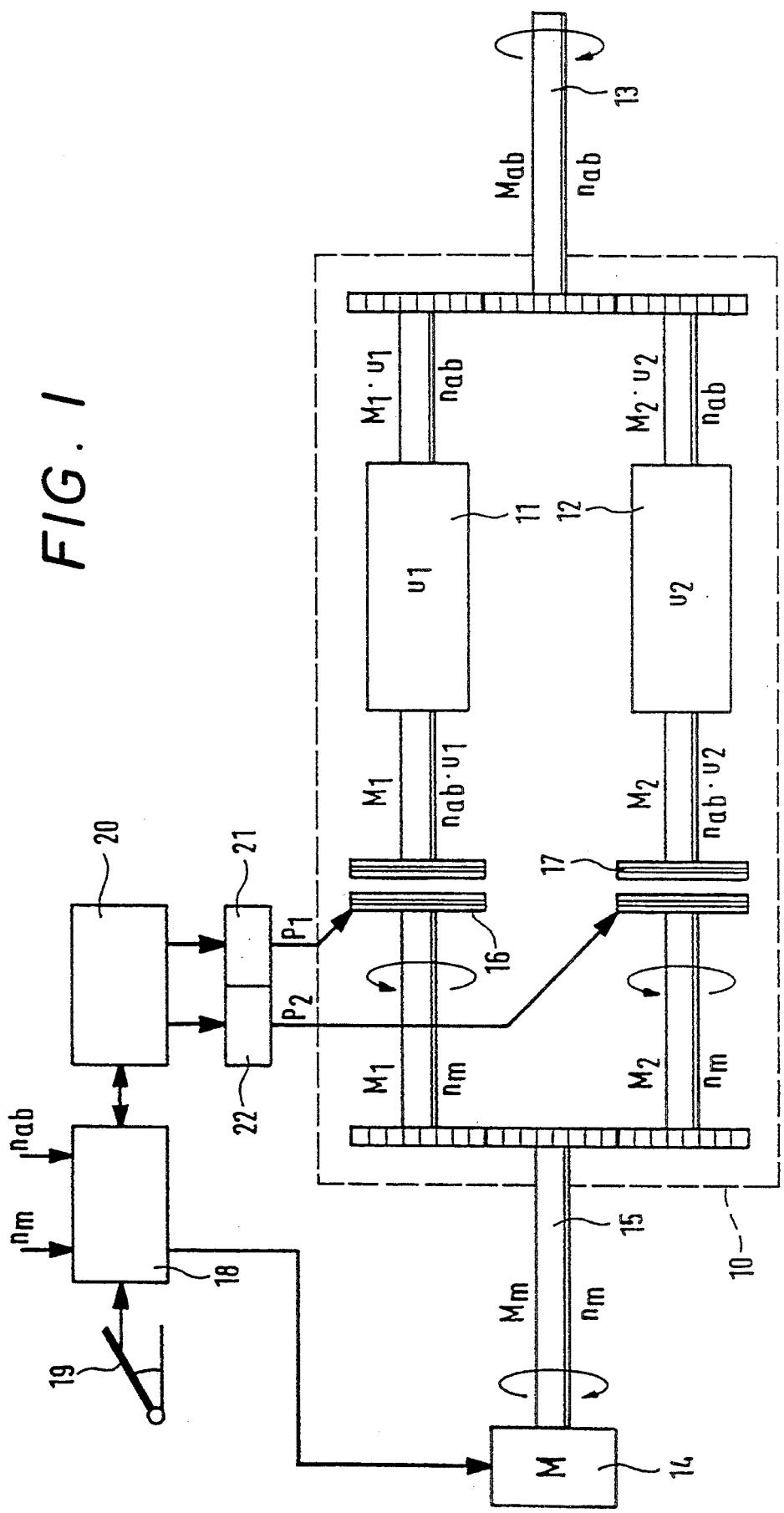
FIG. 1 is a schematic illustration of an automatic multi-stage transmission having two transmission stages, which is driven by an electronic control unit and is an embodiment of the invention.

In the embodiment shown in FIG. 1, an automatic multi-stage transmission 10 is shown schematically. The automatic multi-stage transmission includes two transmission stages or shifting stages which in the following are identified as the first stage 11 and the second stage 12. The transmission ratio of the first gear stage 11 is $u_1$ and the transmission ratio of the second stage 12 is $u_2$. The toothed wheels required for obtaining transmission ratios of this kind and their intermeshing are shown as rectangular blocks for simplification. The two stages 11 and 12 are brought together to a common output shaft 13 via which the wheels of the vehicle are driven in a manner not shown and, if necessary, via a differential. The output torque is $M_{ab}$ and the output rpm is $n_{ab}$. The multi-stage transmission 10 is driven via a drive shaft 15 by a motor 14. The motor 14 transmits the motor torque $M_m$ and the motor rpm $n_m$ to the multi-stage transmission 10. This motor is generally an internal combustion engine such as a spark-ignition engine or a diesel engine. However, in principle, the motor can also be an electric motor. The drive shaft 15 is connected via two clutches (16, 17) to the two stages (11, 12). Only a two-shaft transmission is shown in this embodiment to provide a better overview. However, a realization with a greater number of shafts or as a planetary transmission is also possible.

The following description is applicable to a shift operation for a closed converter clutch of the automatic multi-stage transmission 10 which is provided in practically every automatic transmission. However, the converter clutch is not shown here for the purposes of simplification. If shifting takes place with the converter clutch open, then the turbine torque is substituted for the motor torque and the turbine rpm is substituted for the motor rpm. In the material which follows, when the terms "motor torque" and "motor rpm" are used, then it is understood that also the turbine torque and the turbine rpm, respectively, are intended when the converter clutch is open.

An electronic motor-control unit 18 is provided for controlling the motor 14. The motor 14 is controlled by the motor-control unit 18 in a manner known per se via open-loop or closed-loop control of the ignition and/or of the metered air and/or metered fuel. This can take place with respect to pregiven functions or characteristic fields. The driver command with respect to the output torque, the motor power or the road speed of the vehicle are pregiven via an accelerator pedal 19. In addition, at least the motor rpm $n_m$ is pregiven to the motor-control unit 18. Influencing with other parameters is not shown for the purpose of simplification.

An electronic transmission-control unit 20 is connected to the motor-control unit 18 and, in turn, controls two pressure controllers (21, 22) for generating the clutch pressure $p_1$ and $p_2$ for the two clutches (16, 17). The particular closed clutch determines the transmission stage and a shift operation is primarily carried out by disengaging this clutch and engaging another clutch of another stage. This will be explained below in greater detail.

For simplification, only two stages (11, 12) are shown; however, the automatic multi-stage transmission 10 can, of course, also have a larger number of stages. The illustration of two stages is, however, adequate for explaining the shift operation.

The motor-control unit 18 and the transmission-control unit 20 are customarily configured as computer controls having control data stored in characteristic fields. These units can be configured so as to be separate or as a single computer.

Figure 2:
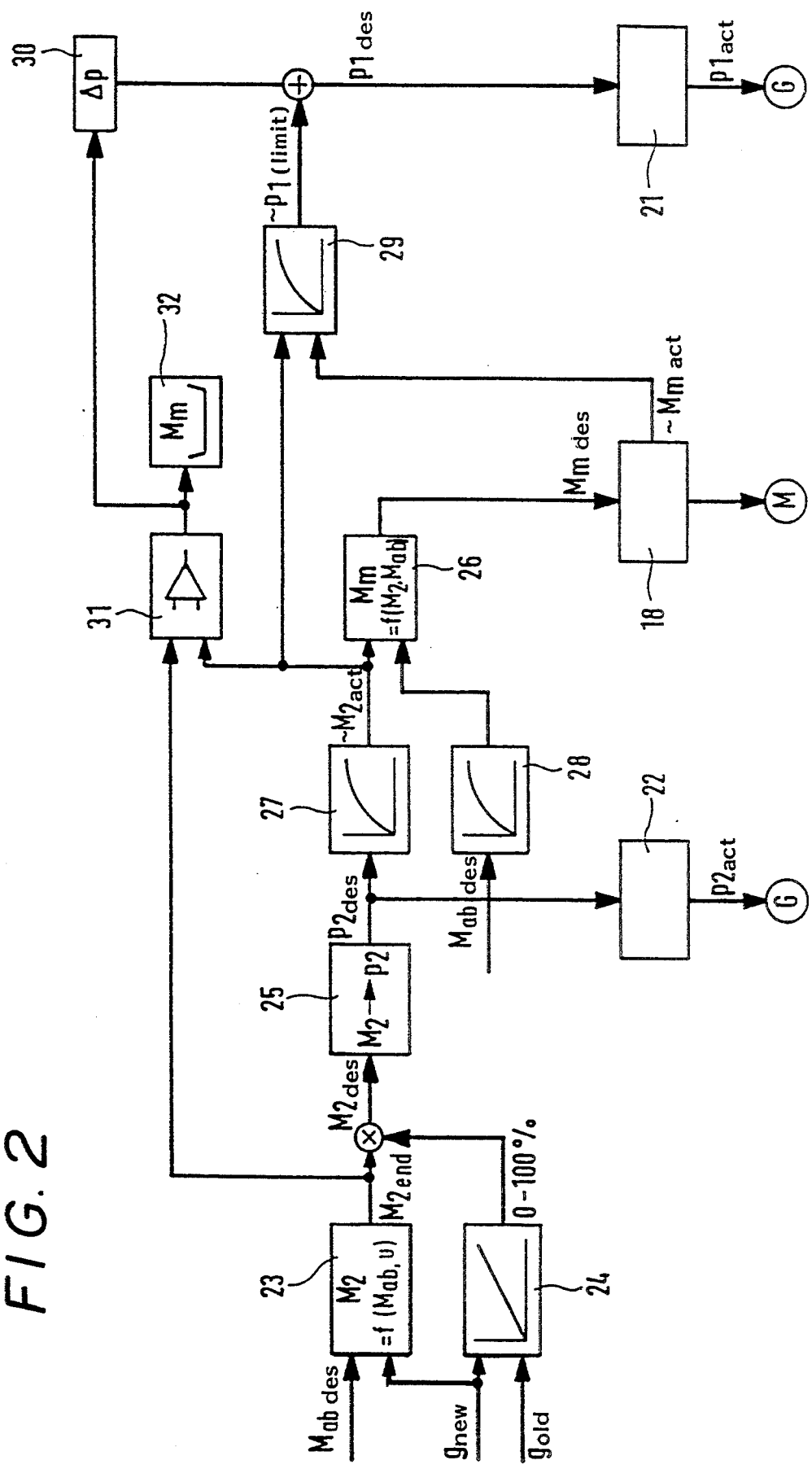
FIG. 2 is a function sequence presentation of the operations d g an upshift operation.
Figure 3:
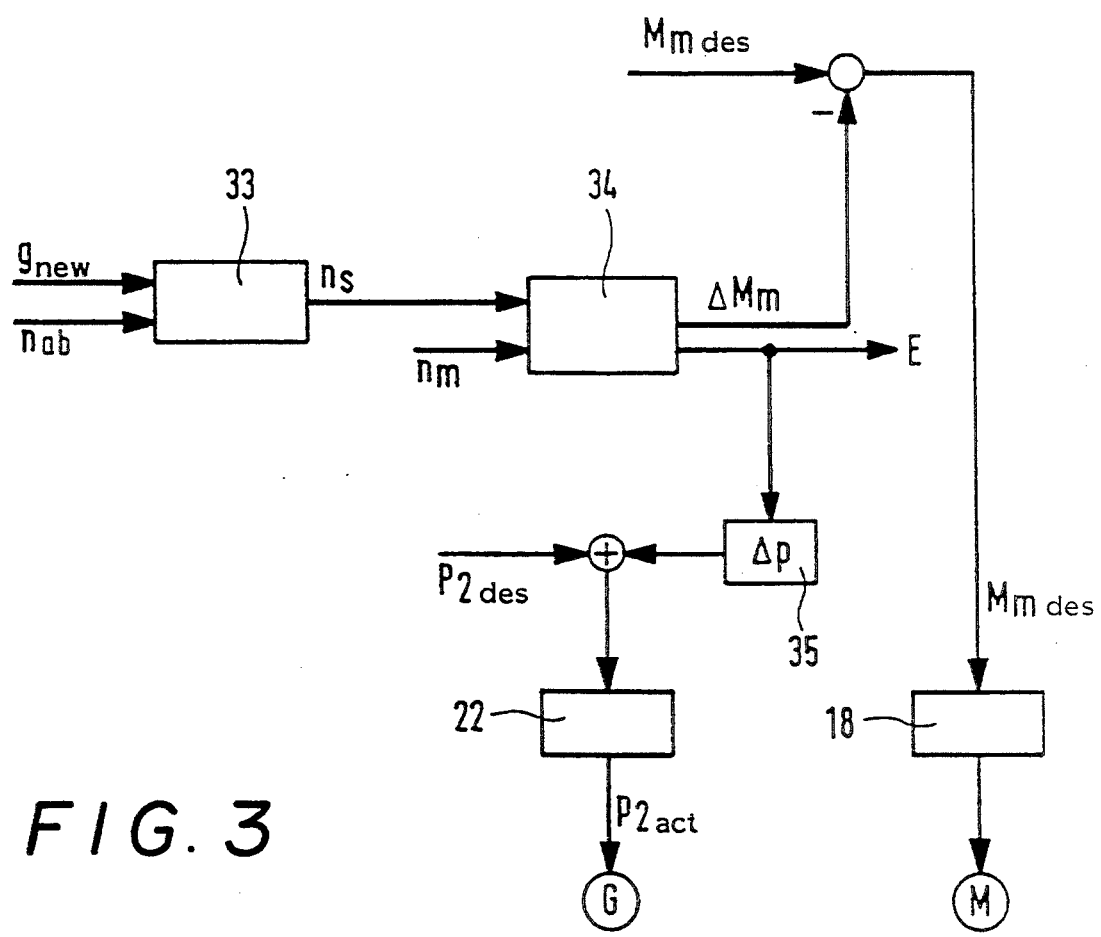
FIG. 3 is a function sequence presentation of the last phase of the upshifting operation in a detailed form.

An upshift operation is explained in the following with respect to FIGS. 2 to 4 wherein the starting point is the engaged first stage 11; that is, the clutch 16 is engaged and the clutch 17 is disengaged. A complete torque is then transmitted via the clutch 16 operating without slippage. For the upshift, the clutch 17 must assume the torque of the clutch 16 in a first phase. For this purpose, a pressure is built up in the clutch 17 until the clutch completely transfers the motor torque and thereby relieves the clutch 16 of load which can then be disengaged. The clutch 17 operates at this time with slippage and is now, in a second phase, brought to its synchronous rpm by reducing the motor rpm $n_m$ and is then closed without slippage. The output torque $M_{ab}$ is held constant during all of the steps. The motor torque $M_m$ is correspondingly controlled for this purpose. These operations are illustrated in broad outline and will now be explained in detail.

At time point $t_1$, a shift command is issued via the shift program. The shift command can be issued, for example, when an output-rpm threshold is exceeded or via a manual actuation by the driver. A switchover from the up-to-now first stage ($g_{old}$) to the second stage ($g_{new}$) is to be triggered by the shift command. In a computer sequence 23, the desired end value $M_{2\ end}$ for the transfer torque of the clutch 17 is determined from the desired value of the output torque $M_{ab\ des}$ and the transmission ratio $u_2$ of the new stage in accordance with the following equation:

$$M_{2\ end} = (1/u_2) \cdot M_{ab} \qquad (1)$$

A ramp function $f(t)$ via the ramp sequence 24 is now superposed multiplicatively on this required end value for the transfer torque with $f(t)$ starting at value 0 and continuing up to the value 1. From this, a time-dependent preset desired value for the transfer torque of the clutch 17 results in accordance with the following equation:

$$M_2(t) = f(t) \cdot (1/u_2) \cdot M_{ab} \qquad (2)$$

In the simplest case, the transmission torque is proportional to the pressure $p_2$ however, for a more precise computation, additional parameters such as oil temperature, the extent of wear of the clutch, et cetera, can be considered. From the relationship which is presumed known, the pressure $p_2$ as a function of time is therefore obtained from the equation (2) in the computation sequence 25:

$$p_2(t) = p_2(M_2(t)) \qquad (3)$$

This computed desired value for the pressure of the clutch 17 changes as a function of time and is now supplied to the associated pressure controller 22. The controller 22 slowly builds up the pressure in the clutch 17 in dependence upon this function so that the transfer torque $M_2$ increases in correspondence to the ramp function.

The output torque $M_{ab}$ is made up of the torques $M_1$ and $M_2$ as well as the corresponding transmission ratios according to the following equation:

$$M_{ab} = M_1 \cdot u_1 + M_2 \cdot u_2 \qquad (4)$$

Furthermore, the torque $M_m$ corresponds to the sum of the torques $M_1$ and $M_2$. $M_{ab}$ is pregiven by the driver command, that is, $M_{ab}$ is dependent inter alia on the pedal position of the accelerator pedal 19. In this way, the following relationship results for the required motor torque:

$$M_m = (1/u_1) \cdot M_{ab} + (1 - u_2/u_1)) \cdot M_2 \qquad (5)$$

The computation of this required motor torque $M_m$ takes place in the computation sequence 26 where first $p_{2\ des}$ is converted in the computation sequence 27 with respect to a pressure controller model and an inverse clutch model into the transfer torque $M_{2\ act}$ which is to be expected. Here, the dead times and deceleration times are considered in the course of the pressure sequences in the clutch, for example, with respect to functions or characteristic fields. A corresponding correction with respect to the actual real operations of the output torque $M_{ab\ des}$ takes place in the computation sequence 28.

Figure 4:
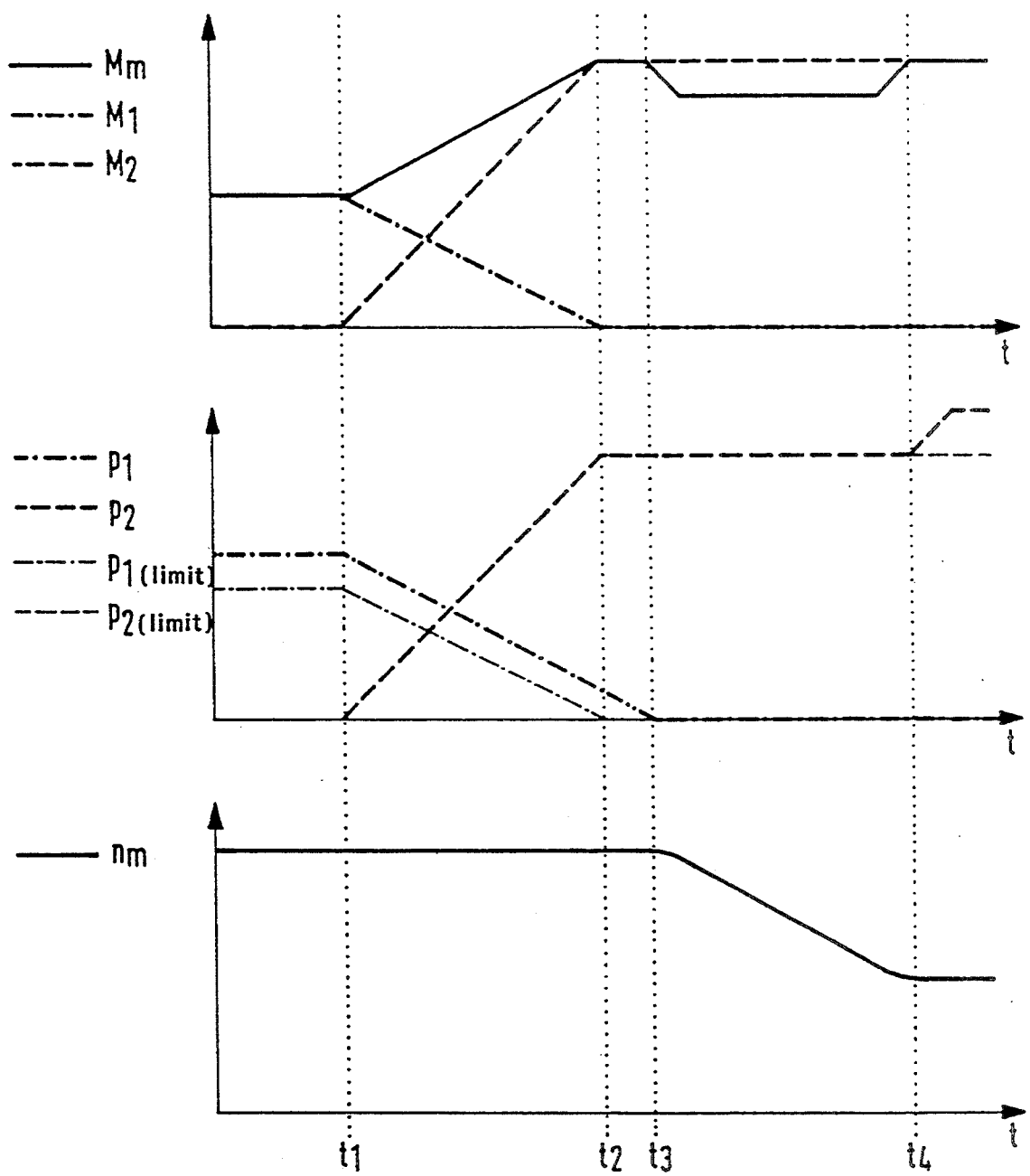
FIG. 4 is signal sequence diagram for explaining the operations during the upshifting operation; and, FIG. 5 is a signal sequence diagram for explaining the operations during a downshifting operation.

The computed desired value for the motor torque $M_{m\ des}$ is now pregiven to the motor-control unit 18 which likewise increases the motor torque in accordance with a ramp of FIG. 4. During this motor-torque increase, the clutch 16 operates without slippage and the clutch 17 with slippage. The transfer torque of the clutch 16 then becomes continuously less. In the computation sequence 29, the required limit value $p_{1\ limit}$ for the clutch 16 is computed which is required for the transfer of the torque $M_1$ which becomes less. A safety value $\Delta p$ is added in the addition step 30 to ensure that the clutch 16 operates without slippage. The resulting desired value $p_{1\ des}$ for the clutch 16 is then supplied to the pressure controller 21 which can then cause the pressure $p_1$ to drop as a consequence of the transfer torque which becomes smaller.

At time point $t_2$, the transfer torque $M_2$ of the clutch 17 reaches the pregiven end value $M_{2\ end}$. This is recognized by means of a comparison function 31. At this time point, the clutch 16 is relieved of load and no longer transmits torque. For this reason, the clutch at this time point is completely disengaged without jolt by means of the removal of the pressure $p_1$ via the comparison function 31. As soon as the clutch 16 is disengaged, the second shift phase 32 is started and is likewise initiated by the comparison function 31. The second phase 32 is shown in detail in FIG. 3.

The total transmission torque is transmitted at this time point via the slipping clutch 17. In computation sequence 33, the synchronous rpm $n_s$ of the clutch 17 is computed in dependence upon the transmission ratio $u_2$ and the output rpm $n_{ab}$ and is compared to the motor rpm $n_m$ in the comparison function 34. A difference is present here because of the slipping clutch. For this reason, a negative value $M_n$ is superposed on the desired value for the motor torque computed in computation sequence 26 so that the desired value is reduced by this value $M_n$. This reduction of the motor torque becomes effective at time point $t_3$. In this way, the slippage in the clutch 17 is reduced by the reduction of the motor rpm $n_m$. As soon as the slippage is removed, the motor rpm $n_m$ corresponds to the synchronous rpm $n_s$ and the value $M_n$ is again returned to the value 0 via the comparison operation 34 in order that no abrupt drop in torque at the output occurs. At this time point, the shift operation is seen as ended and the pressure $p_2$ is again increased in addition function 35 by a safety addition $\Delta p$ which reliably prevents a complete slippage of the clutch 17. At the same time, the end of the shift operation E is signaled.

Figure 5:
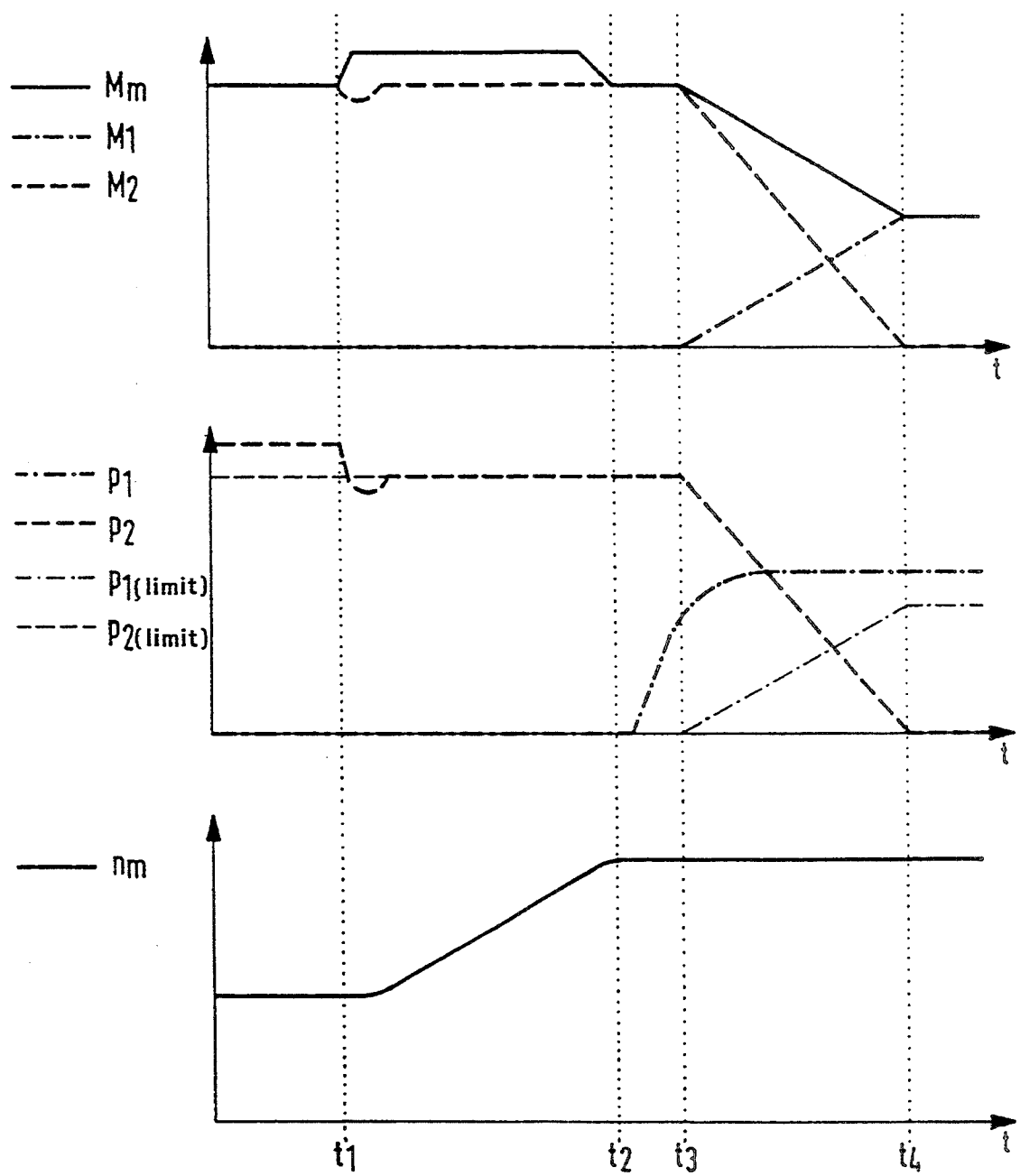

The downshift takes place essentially by the reversal of the upshift operation so that still another detailed description is unnecessary. FIG. 5 serves to explain. The start situation is the engaged second stage for an engaged slip-free clutch 17 and disengaged clutch 16.

At time point $t_1$, the downshift operation is initiated by increasing the motor torque by the amount $M_n$. The pressure $p_2$ in the clutch 17 is first dropped for a short time below a value $p_2(M_2)$ which would be required in order to transmit the torque $M_2$ while the clutch 17 is slipping. Since the transition from static friction to sliding friction is customarily associated with a hysteresis, it is ensured that the clutch 17 reliably transfers to sliding friction. The transferred torque $M_2$ remains constant at clutch pressure $p_2(M_2)$ except for a small short drop of $p_2$ for overcoming the hysteresis while the motor speed $n_m$ increases. When the synchronous rpm of the first stage or the clutch 16 is reached, which is the case at time point $t_2$, the increase of the motor torque by the excess $\Delta M$ is again withdrawn. The clutch 16 is engaged as quickly as possible by applying the pressure $p_1$. This engagement takes place practically without a jolt because the clutch 17 still transmits the complete motor torque and the motor rpm is equal to the synchronous rpm in the first stage. The pressure $p_1$ must lie above the required value $p_{1\ limit}$ in order to obtain the fastest possible slip-free operation of the clutch 16.

The clutch 16 must now slowly assume the transmission of the torque. This takes place in that the transmission torque $M_2$ is reduced in the reversal to the upshifting by the following function:

$$M_2(t) = g(t) \cdot (1/u_2) \cdot M_{ab} \qquad (6)$$

The function $g(t)$ then defines a time-dependent reversal of the function $f(t)$ in accordance with equation (2). In this way, the torque $M_2$ reduces continuously and the torque $M_1$ increases continuously. The torque $M_2$ is transmitted by clutch 17 and the torque $M_1$ is transmitted by the clutch 16. The motor torque $M_m$ according to equation (5) must again be correspondingly controlled so that the output torque according to equation (4) remains constant. This means that motor torque $M_m$ is now reduced according to FIG. 5 The shift operation is ended when the torque $M_2$ has dropped to the value 0 at time point $t_4$ with the torque $M_2$ being transmitted by clutch 17. The clutch 17 is then completely disengaged and the clutch 16 transmits completely the motor torque $M_m$.

It is noted that the linear increase and the linear reduction of the motor torque $M_m$ in FIGS. 4 and 5 proceeds from a simple assumption. This torque curve can, of course, also be nonlinear when this is advantageous for obtaining more favorable shifting times.

We claim:

1. An arrangement for controlling the output torque of an automatic transmission during the sequence of a shift operation in a motor-driven vehicle to a value pregiven by the driver with the transmission having lower and higher transmission stages which can be alternately shifted into via first and second clutches corresponding to the lower and higher transmission stages, respectively, the transmission stages having respective transmission ratios ($u_1$ and $u_2$), the arrangement being for upshifting the transmission and comprising:

means for detecting a driver pregiven desired value ($M_{ab\ des}$) of the output torque at start time point ($t_1$) of the upshifting operation;

means for providing a time-controlled continuous engagement of said second clutch until reaching a transmission torque ($M_2$) of said second clutch burdened with slippage;

said transmission torque ($M_2$) corresponding to said desired value ($M_{ab\ des}$) divided by the transmission ratio ($u_2$) of said higher transmission stage;

means for providing a simultaneous corresponding time-controlled disengagement of said first clutch of said lower transmission stage;

means for providing a simultaneous corresponding time-controlled increase of the motor torque ($M_m$) to a value ($M_{m\ des}$) which corresponds to said desired value ($M_{ab\ des}$) divided by said transmission ratio ($u_2$) of said higher transmission stage;

means for thereafter disengaging said first clutch;

means for thereafter temporarily reducing said motor torque ($M_m$) until the synchronous rpm ($n_s$) of said second clutch is reached; and, means for thereafter increasing the clutch engaging pressure ($p_2$) of said second clutch.

2. The arrangement of claim 1, further comprising first computing means for computing the desired value for the transmitting torque and the clutch-engaging pressure of the corresponding clutch from the pregiven desired value for the output torque ($M_{ab}$) in dependence upon the particular transmission stage.

3. The arrangement of claim 2, wherein said means for providing the time-controlled continuous engagement of said second clutch has a ramp control for the desired value of the transmission torque.

4. The arrangement of claim 3, wherein said first computation means includes a computation stage for determining a theoretical actual value for the transmission torque ($M_{2\ act}$) of the associated clutch from the desired value while considering a pressure-controller model for an associated pressure controller.

5. The arrangement of claim 4, further comprising second computing means for computing the corresponding desired motor torque ($M_{m\ des}$) from the desired value ($M_{ab\ des}$) for the output torque and the instantaneous or changing transmission torque ($M_2$) of the slipping clutch.

6. The arrangement of claim 5, further comprising comparison means for comparing a computed end value ($M_{2\ end}$) for the transmission torque of the slipping clutch to the instantaneous value of this transmission torque; and, the other clutch, which participates in the upshifting operation, being disengaged when equality is reached and the slipping clutch being brought to its synchronous rpm by influencing the motor.

7. The arrangement of claim 6, further comprising means for increasing the pressure of the clutch pressure to a value which prevents slippage when the particular synchronous rpm is reached.

8. The arrangement of claim 7, further comprising electronic control means connected to the motor for adjusting the actual motor torque with the desired value for the motor torque ($M_{m\ des}$) being applied to said electronic control means.

9. The arrangement of claim 8, said first and second clutches being connected to pressure regulators which are charged by the particular desired value for the clutch-engaging pressure.

10. An arrangement for controlling the output torque of an automatic transmission during the sequence of a shift operation in a motor-driven vehicle to a value pregiven by the driver with the transmission having lower and higher transmission stages which can be alternately shifted into via first and second clutches corresponding to the lower and higher transmission stages, respectively, the transmission stages having respective transmission ratios ($u_1$ and $u_2$), the arrangement being for downshifting the transmission and comprising:

means for detecting a driver pregiven desired value ($M_{ab\ des}$) of the output torque at start time point ($t_1$) of the upshifting operation;

means for reducing the clutch-engaging pressure ($p_2$) of said second clutch to a value for transmitting the instantaneous transmission torque ($M_2$) which is just adequate, during the slipping state of said second clutch, said second clutch being engaged at said start time point ($t_1$);

means for thereafter temporarily increasing the motor torque ($M_m$) until the motor rpm ($N_m$) corresponds to the synchronous rpm ($n_s$) of said first clutch;

means for thereafter engaging said first clutch without slippage;

means for thereafter or simultaneously continuously disengaging said second clutch in a time-controlled manner until said second clutch is completely disengaged; said second clutch being burdened with slippage; and, means for the simultaneously reducing said motor torque ($M_m$) in a correspondingly controlled manner to a value which corresponds to said desired value ($M_{ab\ des}$) divided by said transmission ratio ($u_1$).

11. The arrangement of claim 10, said means for reducing the clutch-engaging pressure ($p_2$) including control means for effecting a transition in the sliding friction of the second clutch by means of a short-term additional reduction of the engaging pressure.

12. The arrangement of claim 11, further comprising first computing means for computing the desired value for the transmitting torque and the clutch-engaging pressure of the corresponding clutch from the pregiven desired value for the output torque ($M_{ab}$) in dependence upon the particular transmission stage.

13. The arrangement of claim 12, wherein said means for providing the time-controlled continuous engagement of said second clutch has a ramp control for the desired value of the transmission torque.

14. The arrangement of claim 13, wherein said first computation means includes a computation stage for determining a theoretical actual value for the transmission torque ($M_{2\ act}$) of the associated clutch from the desired value while considering a pressure-controller model for an associated pressure controller.

15. The arrangement of claim 14, further comprising second computing means for computing the corresponding desired motor torque ($M_{m\ des}$) from the desired value ($M_{ab\ des}$) for the output torque and the instantaneous or changing transmission torque ($M_2$) of the slipping clutch.

16. The arrangement of claim 15, further comprising comparison means for comparing a computed end value ($M_{2\ end}$) for the transmission torque of the slipping clutch to the instantaneous value of this transmission torque; and, the other clutch, which participates in the upshifting operation, being disengaged when equality is reached and the slipping clutch being brought to its synchronous rpm by influencing the motor.

17. The arrangement of claim 16, further comprising means for increasing the pressure of the clutch pressure to a value which prevents slippage when the particular synchronous rpm is reached.

18. The arrangement of claim 17, further comprising electronic control means connected to the motor for adjusting the actual motor torque with the desired value for the motor torque ($M_{m\ des}$) being applied to said electronic control means.

19. The arrangement of claim 18, said first and second clutches being connected to pressure regulators which are charged by the particular desired value for the clutch-engaging pressure.

* * * * *

UNITED STATES PATENT AND TRADEMARK OFFICE
CERTIFICATE OF CORRECTION

PATENT NO. : 5,407,401

DATED : April 18, 1995

INVENTOR(S) : Wolfgang Bullmer, Martin Streib, Richard Schöttle and Hong Zhang It is certified that error appears in the above-identified patent and that said Letters Patent is hereby corrected as shown below:

Title page, item [54], and col. 1, line 1 delete "ARRANGEMENT OF" and substitute -- ARRANGEMENT FOR -- therefor.

In the title page, in the Abstract, line 18: delete "any".

In column 1, line 1: delete lines 27 to 29 and substitute -- United States Patent 5,325,740 and United States patent application serial no. 08/050,085, filed April 28, 1993, already suggest that the output torque can -- therefor.

In column 1, line 56: delete "any", insert --a--.

In column 2, lines 52 and 53: delete "is applied".

In column 2, line 54: delete "pressure." and substitute -- pressure is applied. -- therefor.

UNITED STATES PATENT AND TRADEMARK OFFICE
CERTIFICATE OF CORRECTION

PATENT NO. : 5,407,401

DATED : April 18, 1995

INVENTOR(S) : Wolfgang Bullmer, Martin Streib, Richard Schöttle and Hong Zhang It is certified that error appears in the above-identified patent and that said Letters Patent is hereby corrected as shown below:

In column 2, line 64: delete "d g" and substitute -- during -- therefor.

In column 4, line 52: between "p$_2$" and "however", insert --,--.

In column 6, line 53: delete "FIG. 5" and substitute -- FIG. 5. -- therefor.

In column 8, line 39: delete "the".

Signed and Sealed this

Ninth Day of January, 1996

*Attest:*

BRUCE LEHMAN

*Attesting Officer*  *Commissioner of Patents and Trademarks*